United States Patent Office 2,776,063
Patented Jan. 1, 1957

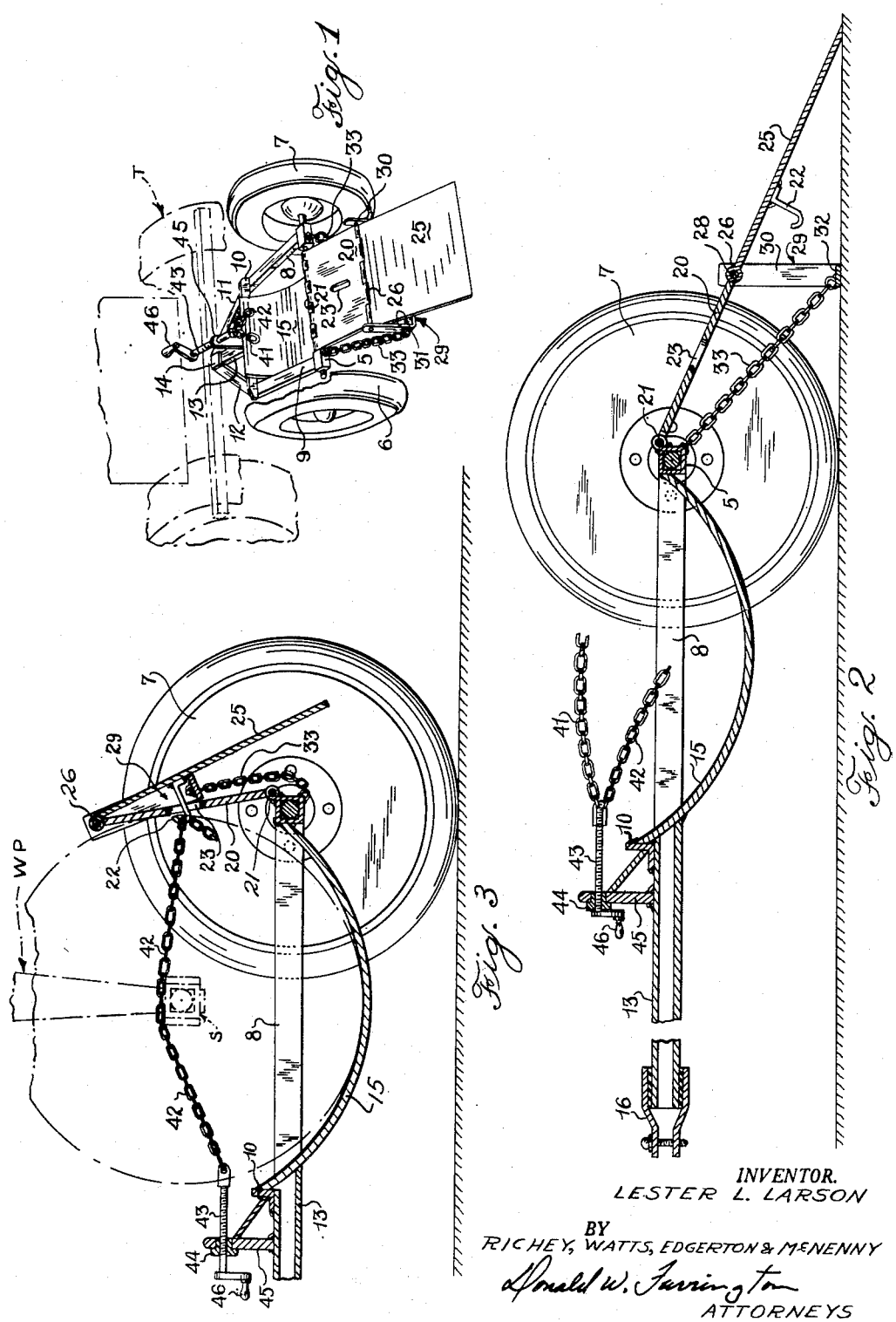

2,776,063

TOW TRAILER FOR TRACTOR

Lester L. Larson, Princeville, Ill.

Application January 26, 1956, Serial No. 561,616

6 Claims. (Cl. 214—334)

This invention relates to a towing dolly for tractors and more particularly to a towing dolly constructed and arranged to support the front wheels of a tractor above the ground while the rear wheels of the tractor rest upon and are pulled over the ground.

With the advent of mechanization of farm implements and the wide use of farm tractors, it is frequently necessary to move the tractor considerable distances. To expedite the transport of the tractor rather than drive the tractor under its own power over such distances, it is desirable to provide a dolly which may be pulled behind a truck or automobile so that the tractor may be economically transported at relatively high speeds and with safety and without using the engine and driving mechanism of the tractor itself. Numerous expedients have been proposed to provide for the transport of farm tractors on dollies and some of the prior art proposals have included an arrangement wherein a two-wheel dolly is provided with a wheel well and a ramp so that the tractor may be driven on to the dolly with the front wheels in the wheel well. Some of such prior art devices have proposed the use of a dropped axle for the dolly so that a relatively short ramp may be used and other proposals suggest a separable ramp so that a longer ramp may be used to run the front wheels up into the wheel well of the dolly.

According to the present invention I have provided a dolly having a wheel well and a sturdy two part folding ramp which will provide an easy slope for raising the front wheels of the tractor into the wheel well of the dolly and wherein the ramp may be folded upwardly and form a part of an anchoring means to securely anchor the front wheels of the tractor in the wheel well of the dolly.

It is among the objects of my invention to provide a tractor dolly having a sectional ramp wherein the upper section is hinged to the axle of the dolly and a lower part of the ramp is hinged to the lower edge of the upper section and wherein the upper section is slotted to accommodate a hook on the underside of the lower section whereby when the ramp is folded upwardly the hook extends through the slot and serves as a chain anchor for restraining movement of the tractor with respect to the dolly.

Further objects and advantages relating to safety in operation, economy in manufacture and convenience of use will appear from the following description and the appended drawings wherein—

Fig. 1 is a perspective view of a tractor dolly made according to my invention with the ramp in lowered position;

Fig. 2 is an elevation with parts in section showing the ramp in its lowered position and the restraining chain tightener in retracted position; and Fig. 3 is an elevation with parts in section showing the ramp in its folded position and the front wheels of a tractor in the wheel well being held in position by the chain tightener and the ramp.

The dolly frame comprises a straight axle 5 having wheels 6 and 7 mounted on the ends of the axle and longitudinally extending frame members 8 and 9 securely fixed by welding or otherwise to the axle 5 at their rear ends and joined to each other at their forward ends by a transverse frame member 10. Forwardly of the frame members 8 and 9 are converging frame members 11 and 12 secured to a centrally arranged frame member or tongue 13 as at 14. The frame sections 8, 9, 11, 12 and 13 may be conveniently formed of tubular stock or may be heavy angle iron stock. The transverse frame member 10 is preferably an angle iron with one flange of the angle iron extending vertically to provide a surface suited for butt welding to the edge of the curved wheel well member 15. The longitudinally extending frame member or tongue 13 is extended rearwardly underneath the frame member 10 and is welded to the wheel well member 15 as best shown in Fig. 2. The forward end of the tongue 13 is preferably provided with a clevis or hitch coupling 16 for coupling the dolly for towing to a truck or the like as indicated in phantom outline in T in Fig. 1.

The ramp, according to the present invention, includes an upper section 20 hinged as at 21 to the axle 5. The hinge is a free swinging hinge so that the section may be swung freely through more than 90° about the hinge pivot. The lower section 25 of the ramp is hinged as at 26 to the lower edge of the ramp section 20. The hinged connection between the ramp sections 20 and 25 may be conveniently formed by folding projecting edge portions on the adjacent ramp sections around a hinge pin 28 which extends through the folded portions and through the apertured ends of the vertical portions of a ramp support indicated in its entirety as at 29.

To support the hinged ramp on the hinge line the ramp support 29 includes vertically extending arms 30 and 31 connected to each other by an integrally formed bottom 32. Thus the ramp support 29 when the hinge pin 28 is riveted or otherwise held in position provides a rigid box-like structure adequate to bear the full weight of the front wheels of the tractor as the tractor is driven forwardly to place the front wheels in the wheel well of the dolly. The transverse portion 32 of the support 29 is connected by a chain 33 to the axle 5 so that when the ramp is folded from the position of Fig. 2 to the position of Fig. 3 the ramp support 29 is pulled into its housed position between the two sections of the ramp 20 and 25 respectively.

Preferably the wheel well 15 and the ramp sections 20 and 25 are formed by heavy gauge rolled steel having a diamond or corrugated tread on one surface. The dolly is constructed to accommodate the conventional farm tractor having closely spaced front wheels supported by a depending wheel post indicated at WP in Fig. 3. A short stub axle extends transversely from the bottom of the wheel post and this stub axle is indicated in Fig. 3 as at S. Usually such front wheels of the conventional tractor toe in or converge at the bottom and thus provides space between the wheel post and inside of each of the front wheels.

According to the present invention the tractor front wheels are retained in the wheel well by a pair of chains 41 and 42 respectively. In Figs. 1 and 2 the chains are broken away for clarity in illustration whereas in Fig. 3 one of the chains 42 is shown in wheel retaining position. The chains are anchored at one end to a longitudinally extending screw 43 threaded in a bushing 44 fixed to an upright member 45 immediately in front of the wheel well. The forward end of the screw 43 is provided with a crank 45 so as to facilitate movement of the screw fore and aft with respect to the wheel well in a manner so as to tighten or loosen the chains 41 and 42.

After the tractor has been driven up the ramp and the front wheels in the wheel well 15, the ramp is folded upwardly about the hinge pin 28 so that the hook 22 which is fixed to the underside of the ramp section 25 will extend through the slot 23 in the upper section of the ramp 20. The hook and slot are arranged on the longitudinal center line of the dolly so that when the ramp is folded as in Fig. 3 the hook will project into the space between the two front wheels of the tractor. One chain 41 is then passed over the stub axle and between the wheel post WP and one of the tractor wheels. The other chain 42 is then passed over the stub axle and at the other side of the wheel post WP and also anchored to the hook 22.

It will be noted that the screw 43 may be fully retracted so as to give the chains 41 and 42 plenty of slack and thus facilitate the hooking of the chain on the hook 22. Thereafter the crank 46 of the chain tightener is turned so as to advance the screw 43 and pull the folded ramp forwardly about its hinge 21 on the axle. The chain tightener 43 is below the stub axles and the slot and hook are arranged so that they are below the horizontal plane of the stub axles whereby when the chain is tightened the stub axle is pulled downwardly in the wheel well and at the same time the ramp section 20 is pulled into tight frictional engagement with the rear edge of both of the tractor wheels carried in the wheel well.

It will be understood from the foregoing description that a relatively long ramp having an easy slope for tractor loading is provided and that the folding ramp functions for loading the tractor and holding the tractor on the dolly after it is loaded. The arrangement here provided whereby the hook is fixed to the underside of the ramp section 25 results in the ramp support 29 being securely clamped so as to prevent rattle and noise of the folding parts and to insure safe operation on the highway. The use of a long folding ramp permits the use of a low cost straight axle and greater road clearance of the wheel well as compared to prior art tractor dollies so that the device may be safely drawn over rough terrain.

Although I have illustrated and described one form of my invention in considerable detail, it will be understood by those skilled in the art that numerous modifications may be made therein without departing from the scope of the invention as defined in the following claims.

What is claimed is:

1. A tractor dolly comprising an axle having wheels at each end of the axle, a rectangular frame secured to the axle and extending forwardly thereof, a curved wheel well supported at its rear edge by said axle and at its forward edge by said frame, a chain tightener mounted forwardly of the wheel well, a chain having one end fixed to said tightener, a ramp comprising two sections hinged to each other and having one of said sections hinged to said axle, said ramp section hinged to the axle having an aperture therein spaced from the axle, said other ramp section having a hook fixed to the underside thereof, said hook being spaced from the hinge between the ramp sections a distance corresponding to the distance between the aperture and said hinge whereby said ramp may be folded upwardly to bear against a tractor wheel within the wheel well with the hook projecting through said aperture to receive the other end of the chain connected to said chain tightener.

2. A tractor dolly comprising a straight axle having wheels at each end of the axle, frame members secured to the axle and extending forwardly thereof, a curved wheel well supported at its rear edge by said axle and at its forward edge by said frame members, a chain tightener fixed on the frame forwardly of the wheel well, a chain on said tightener, a ramp comprising two sections hinged to each other and having one of said sections hinged to said axle, said ramp section hinged to the axle having an aperture therein spaced from the axle, said other ramp section having a hook fixed to the underside thereof, said hook being spaced from the hinge between the ramp sections whereby said ramp may be folded upwardly to bear against a tractor wheel within the wheel well with the hook on said other section projecting through said aperture in one section to receive said chain connected to said chain tightener.

3. A tractor dolly comprising an axle, supporting wheels mounted at each end of the axle, a frame member extending forwardly from the axle adjacent one wheel, a second frame member extending forwardly from the axle adjacent the other wheel, a transverse frame member connecting said forwardly projecting frame members, a chain tightener adjacent said transverse frame member, a heavy gauge metal sheet curved to form a wheel well depending between said forwardly extending frame members, the forward edge of said wheel well sheet being welded to said transverse frame member and the rear edge of said well sheet being welded to said axle, a ramp for said dolly consisting of an upper section hinged to said axle and a lower section hinged to the lower edge of the upper section, said ramp sections comprising heavy gauge metal sheets, said upper ramp section having an aperture spaced from the hinge mounting on the axle and spaced from the hinged connection to the lower ramp section, said lower ramp section having a hook projecting from the under face thereof, a ramp support pivotally mounted on the hinge axis between the ramp sections, tractor holddown means comprising a pair of chains, each chain having one end thereof anchored to the said chain tightener and having the other end thereof anchored to said ramp hook when the ramp is in folded position whereby the upper ramp section bears against a tractor wheel disposed in said wheel well.

4. A tractor dolly comprising an axle having wheels at each end of the axle, a rectangular frame secured to the axle and extending forwardly thereof, a curved wheel well supported at its rear edge by said axle and at its forward edge by said frame, a chain tightener mounted on the frame at the forward edge of the wheel well, a chain carried by the tightener, a ramp for said dolly comprising two sections hinged to each other and having one of said sections hinged to said axle, said ramp section hinged to the axle having an aperture therein, said other ramp section having a chain anchor on the underside thereof whereby said ramp may be folded upwardly to bear against a tractor wheel within the wheel well with the chain anchor accessible through said aperture to receive the end of the chain carried by said chain tightener.

5. A tractor dolly comprising an axle, supporting wheels mounted at each end of the axle, a first frame member extending forwardly from the axle adjacent one wheel, a second frame member extending forwardly from the axle adjacent the other wheel, a third frame member connecting said forwardly projecting frame members, a tongue extending forwardly from said third frame member, a chain tightener on said tongue, a chain having one end fixed to said tightener, a heavy gauge metallic sheet curved downwardly to form a wheel well between said first and second frame members, the forward edge of said wheel well sheet being welded to said third frame member and the rear edge of said well sheet being welded to said axle, a ramp for said dolly consisting of an upper section hinged to said axle and a lower section hinged to the lower edge of the upper section, said upper ramp section having an aperture spaced from the hinge mounting on the axle and spaced from the hinged connection to the lower ramp section, said lower ramp section having a hook projecting from the under face thereof, a ramp support pivotally mounted on the hinge axis between the ramp sections, said chain having the other end thereof anchored to said ramp hook when the ramp is in folded position whereby the upper ramp section bears against a tractor wheel disposed in said wheel well.

6. A tractor dolly comprising a straight axle, supporting wheels mounted at each end of the axle, a frame member extending forwardly from the axle adjacent one wheel, a frame member extending forwardly from the axle adjacent the other wheel, a transverse frame member connecting said forwardly projecting frame members, a metal sheet curved to form a wheel well depending between said forwardly extending frame members, the forward edge of said wheel well sheet being welded to said transverse frame member and the rear edge of said well sheet being welded to said axle, a ramp for said dolly comprising an upper section hinged to said axle and a lower section hinged to the lower edge of the upper section, said upper ramp section having an aperture spaced from the hinge mounting on the axle and spaced from the hinged connection to the lower ramp section, said lower ramp section having a hook projecting from the under face thereof, a ramp support pivotally mounted on the hinge axis between the ramp sections, tractor hold-down means anchored to said ramp hook when the ramp is in folded position whereby the upper ramp section is adapted to bear against a tractor wheel disposed in said wheel well.

No references cited.